US012165814B2

(12) United States Patent
Yoshida

(10) Patent No.: US 12,165,814 B2
(45) Date of Patent: Dec. 10, 2024

(54) SOLID ELECTROLYTIC CAPACITOR

(71) Applicant: Murata Manufacturing Co., Ltd., Nagaokakyo (JP)

(72) Inventor: Yuuji Yoshida, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 257 days.

(21) Appl. No.: 17/952,515

(22) Filed: Sep. 26, 2022

(65) Prior Publication Data

US 2023/0017039 A1 Jan. 19, 2023

Related U.S. Application Data

(63) Continuation of application No. PCT/JP2021/012192, filed on Mar. 24, 2021.

(30) Foreign Application Priority Data

Mar. 31, 2020 (JP) ................................ 2020-064419

(51) Int. Cl.
*H01G 9/15* (2006.01)
*H01G 9/012* (2006.01)
*H01G 9/07* (2006.01)
*H01G 9/08* (2006.01)

(52) U.S. Cl.
CPC ............... *H01G 9/15* (2013.01); *H01G 9/012* (2013.01); *H01G 9/07* (2013.01); *H01G 9/08* (2013.01)

(58) Field of Classification Search
CPC ............ H01G 9/15; H01G 9/012; H01G 9/07; H01G 9/08
See application file for complete search history.

(56) References Cited

U.S. PATENT DOCUMENTS

2002/0015277 A1 2/2002 Nitoh et al.
2007/0285876 A1 12/2007 Takatani et al.
2009/0135550 A1* 5/2009 Umemoto ............ H01G 9/0003 361/523

(Continued)

FOREIGN PATENT DOCUMENTS

CN 101981639 A 2/2011
JP 10945591 A 2/1997

(Continued)

OTHER PUBLICATIONS

International Search Report in PCT/JP2021/012192, mailed Jun. 15, 2021, 4 pages.

*Primary Examiner* — Michael P McFadden
(74) *Attorney, Agent, or Firm* — ArentFox Schiff LLP

(57) ABSTRACT

A solid electrolytic capacitor that includes: a capacitor element including an anode body connected to an anode lead, a dielectric layer on a surface of the anode body, and a cathode layer opposite to the anode body via the dielectric layer; an exterior resin covering the capacitor element; a first external electrode terminal on a first outer surface of the exterior resin and electrically connected to the anode body; a second external electrode terminal on a second outer surface of the exterior resin and electrically connected to the cathode layer; and a resin layer having a lower filler content than the exterior resin and covering at least a portion of an outer periphery of the anode lead between the first outer surface of the exterior resin and the anode body.

17 Claims, 6 Drawing Sheets

(56) References Cited

U.S. PATENT DOCUMENTS

| | | | | |
|---|---|---|---|---|
| 2010/0079930 | A1 | 4/2010 | Hayashi et al. | |
| 2010/0165547 | A1 | 7/2010 | Kuranuki et al. | |
| 2010/0328847 | A1* | 12/2010 | Umemoto | H01G 9/15 361/534 |
| 2011/0019341 | A1 | 1/2011 | Umemoto et al. | |
| 2012/0182668 | A1* | 7/2012 | Kim | H01G 9/15 216/13 |
| 2016/0189872 | A1 | 6/2016 | Naito et al. | |
| 2018/0061587 | A1* | 3/2018 | Yokokura | H01G 11/38 |
| 2019/0287731 | A1* | 9/2019 | Kurihara | H01G 9/15 |

FOREIGN PATENT DOCUMENTS

| | | | |
|---|---|---|---|
| JP | H11080596 | A | 3/1999 |
| JP | 2001230156 | A | 8/2001 |
| JP | 2004063543 | A | 2/2004 |
| JP | 2008010826 | A | 1/2008 |
| JP | 2009094473 | A | 4/2009 |
| JP | 2009272598 | A | 11/2009 |
| JP | 2010087241 | A | 4/2010 |
| JP | 2016122689 | A | 7/2016 |

* cited by examiner

SOLID ELECTROLYTIC CAPACITOR

CROSS REFERENCE TO RELATED APPLICATIONS

The present application is a continuation of International application No. PCT/JP2021/012192, filed Mar. 24, 2021, which claims priority to Japanese Patent Application No. 2020-064419, filed Mar. 31, 2020, the entire contents of each of which are incorporated herein by reference.

FIELD OF THE INVENTION

The present invention relates to a solid electrolytic capacitor.

BACKGROUND OF THE INVENTION

Patent Literatures 1 to 3 each discloses a solid electrolytic capacitor including a capacitor element, an exterior resin covering the capacitor element, an outer anode terminal connected to an anode body of the capacitor element via an anode lead, and an outer cathode terminal electrically connected to a cathode layer of the capacitor element.

Patent Literature 1 discloses a method of forming an outer electrode of a tantalum capacitor, including: pre-treating a surface of a molding material (exterior resin) of a tantalum capacitor with a fluoride; catalytically treating a surface of an anode wire (anode lead) exposed at the surface of the molding material and a surface of the molding material around the anode wire for double coating with palladium, and disposing a nickel plating film on the surfaces of the anode wire and the molding material.

Patent Literature 2 discloses a solid electrolytic capacitor including an anode terminal, a metal wire connected to the anode terminal, and an anode lead to which the metal wire is attached, wherein the metal wire has a bent portion and at least a portion of the bend portion is electrically connected to the anode lead. According to Patent Literature 2, at least a portion of the anode lead may be covered by a resin layer made of a gelatinous material or a rubbery material. The resin layer can protect a connection portion between the bent portion of the metal wire and an end portion of the anode lead, which resultantly improves the reliability of the connection between the anode lead and the anode terminal.

Patent Literature 3 discloses a solid electrolytic capacitor in which an oxygen barrier resin layer made of an insulating resin containing insulating filler is disposed on a surface of capacitor element to cover at least an exposed portion where a conductive polymer layer is exposed at a cathode conductive layer and a portion around the exposed portion. According to Patent Literature 3, preferably, an oxygen barrier resin layer is formed to extend from the exposed portion of the conductive polymer layer to an anode lead, and the oxygen barrier resin layer has an insulating filler content of at least 50 vol % for increasing the distance of a pathway for oxygen ingress.

Patent Literature 1: JP 2009-272598 A

Patent Literature 2: JP 2010-87241 A

Patent Literature 3: JP H9-45591 A

SUMMARY OF THE INVENTION

An exterior resin used in common solid electrolytic capacitors contains filler in an amount of at least 50 wt % for reasons such as increasing the hardness of the exterior resin to prevent deformation from external stress, reducing volume changes in the exterior resin associated with temperature changes during reflow or the like, and reducing the permeability of the exterior resin to external environmental factors such as oxygen and water vapor. Meanwhile, the exterior resin containing filler in an amount of at least 50 wt % contains a relatively low amount of resin component that is more adhesive than the filler, so that the exterior resin has lower adhesion to a metal material defining an anode lead and the like and is susceptible to stress-induced breakage due to its high hardness. As a result, the exterior resin is peeled off at an interface between the exterior resin and the anode lead, and a gap is easily formed between the anode lead and the exterior resin.

Thus, when an external anode terminal is formed by plating as described in Patent Literature 1, a plating solution easily penetrates into a gap between the anode lead and the exterior resin. When the plating solution contacts the capacitor element, a short circuit failure may occur due to contact between metal ions in the plating solution and an oxide film defining a dielectric layer.

Patent Literature 2 and Patent Literature 3 are silent about forming an external anode terminal to be connected to an anode lead by plating, thus indicating an unawareness of the above-described issue in Patent Literature 2 and Patent Literature 3.

The present invention was made to solve the above issue and aims to provide a solid electrolytic capacitor in which a gap is not easily generated between an anode lead and an exterior resin and a short circuit failure due to ingress of a plating solution is prevented or reduced.

A solid electrolytic capacitor of the present invention includes: a capacitor element including an anode body connected to an anode lead made of a valve metal, a dielectric layer on a surface of the anode body, and a cathode layer opposite to the anode body via the dielectric layer; an exterior resin covering the capacitor element; a first external electrode terminal on a first outer surface of the exterior resin and electrically connected to the anode body, the first external electrode terminal including a plating layer connected to the anode lead exposed at the first outer surface of the exterior resin; a second external electrode terminal on a second outer surface of the exterior resin and electrically connected to the cathode layer; and a resin layer having a lower filler content than the exterior resin and covering at least a portion of an outer periphery of the anode lead between the first outer surface of the exterior resin and the anode body.

The present invention provides a solid electrolytic capacitor in which a gap is not easily generated between an anode lead and an exterior resin and a short circuit failure due to ingress of a plating solution is prevented or reduced.

DETAILED DESCRIPTION OF THE PREFERRED EMBODIMENTS

The solid electrolytic capacitor of the present invention is described below.

The present invention is not limited to the following preferred embodiments and may be suitably modified without departing from the gist of the present invention. Combinations of two or more preferred features described in the following preferred features are also within the scope of the present invention.

The following embodiments are examples, and features of different embodiments can be partially exchanged or combined with each other. In the second embodiment and subsequent embodiments, the description of features common to the first embodiment is omitted, and only different points are described. In particular, similar effects by similar features are not mentioned in each embodiment.

In the following description, the solid electrolytic capacitor of the present invention of each embodiment is simply referred to as "the solid electrolytic capacitor of the present invention" when no particular distinction is made therebetween.

First Embodiment

Figure 1:
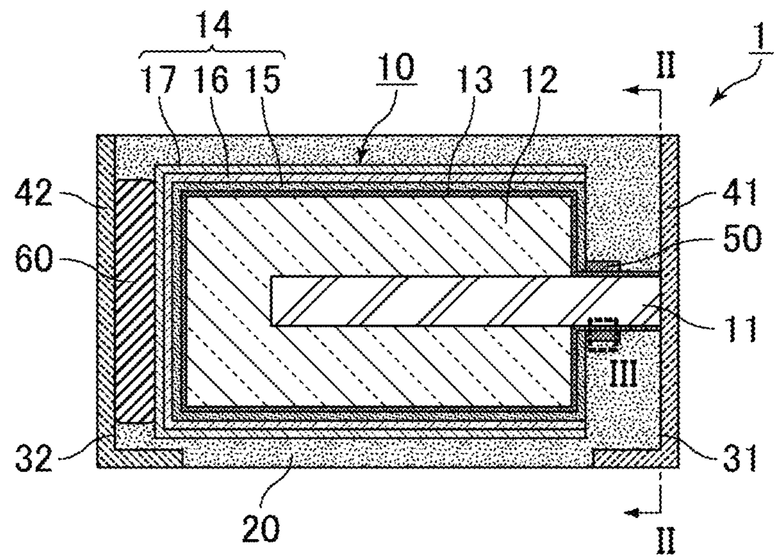
FIG. 1 is a schematic cross-sectional view showing an example of a solid electrolytic capacitor according to a first embodiment of the present invention.
Figure 2:
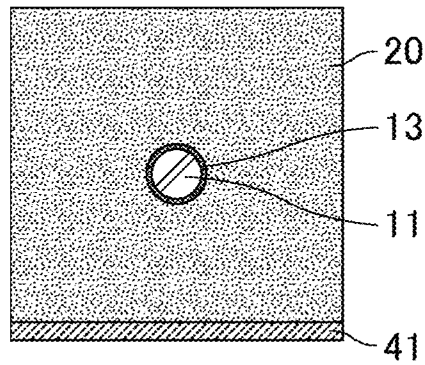
FIG. 2 is a II-II plane view of the solid electrolytic capacitor shown in FIG. 1.

FIG. 1 is a schematic cross-sectional view showing an example of a solid electrolytic capacitor according to a first embodiment of the present invention. FIG. 2 is a II-II plane view of the solid electrolytic capacitor shown in FIG. 1.

A solid electrolytic capacitor 1 shown in FIG. 1 includes a capacitor element 10, an exterior resin 20 covering the capacitor element 10, a first external electrode terminal 41 on a first outer surface 31 of the exterior resin 20, and a second external electrode terminal 42 on a second outer surface 32 of the exterior resin 20. The first outer surface 31 and the second outer surface 32 are opposite to each other.

The capacitor element 10 includes an anode body 12 connected to an anode lead 11, a dielectric layer 13 on a surface of the anode body 12, and a cathode layer 14 opposite to the anode body 12 via the dielectric layer 13.

As shown in FIG. 1 and FIG. 2, the anode lead 11 is exposed at the first outer surface 31 of the exterior resin 20. The anode lead 11 has a wire shape and is made of a tantalum wire, for example. The anode lead 11 is inserted into the anode body 12. The anode body 12 is made of a sintered body of tantalum powder, for example. In this case, the dielectric layer 13 can be formed by forming an oxide film on a surface of the sintered body. The cathode layer 14 includes a solid electrolyte layer 15 on a surface of the dielectric layer 13, a carbon layer 16 on a surface of the solid electrolyte layer 15, and a silver paste layer 17 on a surface of the carbon layer 16. As shown in FIG. 1 and FIG. 2, the dielectric layer 13 may also be on a surface of a portion of the anode lead 11, the portion sticking out of the anode body 12.

The first external electrode terminal 41 is an external anode terminal electrically connected to the anode body 12. The first external electrode terminal 41 includes a plating layer, and the plating layer is connected to the anode lead 11 exposed at the first outer surface 31 of the exterior resin 20. The plating layer may be directly connected to the anode lead 11 exposed at the first outer surface 31 of the exterior resin 20 or may be connected thereto via an auxiliary member.

The second external electrode terminal 42 is an external cathode terminal electrically connected to the cathode layer 14. The second external electrode terminal 42 includes a plating layer, for example, and the plating layer is connected to the cathode layer 14 via a conductive paste layer 60 such as a silver paste layer.

In the solid electrolytic capacitor 1, a portion of an outer periphery of the anode lead 11 between the first outer surface 31 of the exterior resin 20 and the anode body 12 is covered by a resin layer 50 having a lower filler content than the exterior resin 20.

Figure 3:
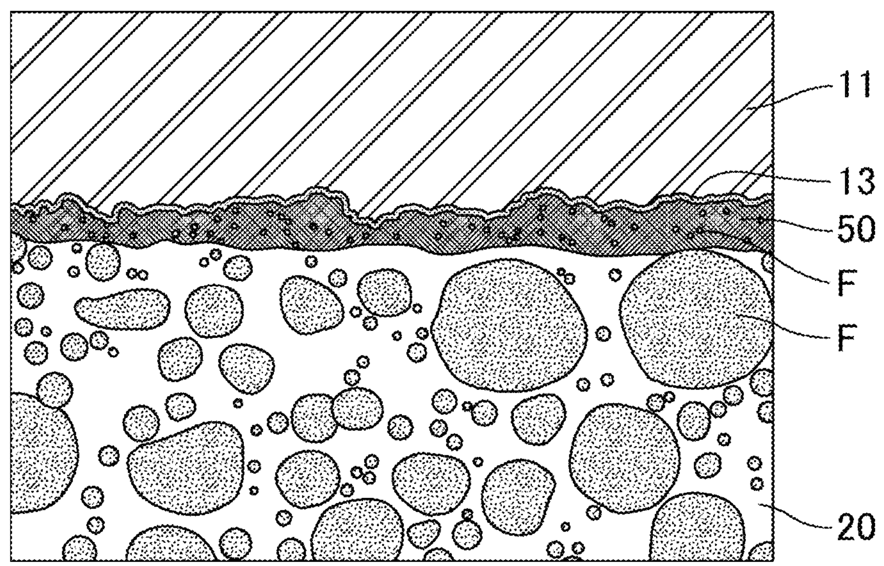
FIG. 3 is a schematic enlarged cross-sectional view of a portion III of the solid electrolytic capacitor shown in FIG. 1.

FIG. 3 is a schematic enlarged cross-sectional view of a portion III of the solid electrolytic capacitor shown in FIG. 1.

As shown in FIG. 3, when the outer periphery of the anode lead 11 is covered by the resin layer 50 having a lower filler content than the exterior resin 20, no gap is generated between the anode lead 11 and the exterior resin 20.

Figure 4:
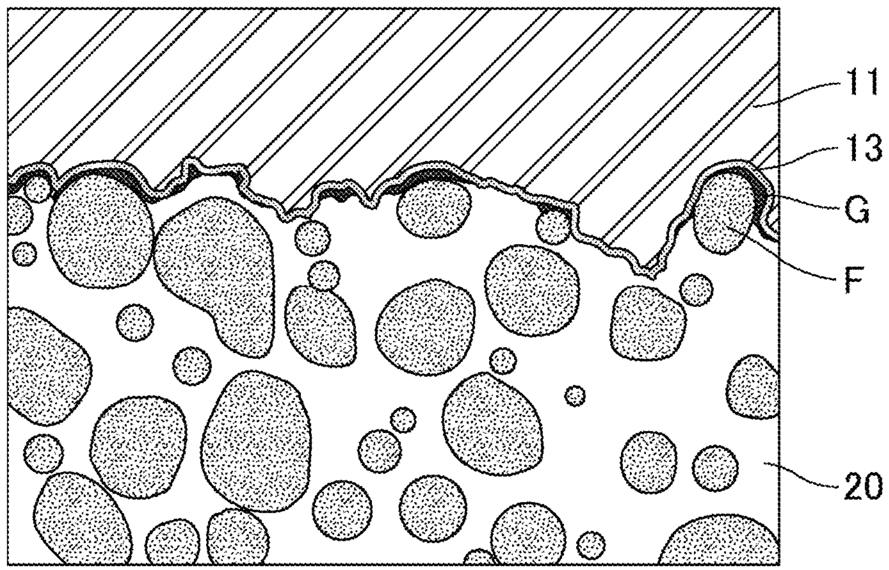
FIG. 4 is a schematic enlarged cross-sectional view of a portion of a conventional solid electrolytic capacitor.

FIG. 4 is a schematic enlarged cross-sectional view of a portion of a conventional solid electrolytic capacitor.

As shown in FIG. 4, when the outer periphery of the anode lead 11 is not covered by the resin layer 50, a gap G is generated between the anode lead 11 and the exterior resin 20. Specifically, the gap G is generated at an interface contacting filler F in the exterior resin 20 and the anode lead 11.

In the solid electrolytic capacitor of the present invention, at least a portion of the outer periphery of the anode lead between the first outer surface of the exterior resin and the anode body is covered by the resin layer having a lower filler content than the exterior resin.

The resin layer having a lower filler content than the exterior resin contains a large amount of resin component that is more adhesive than the filler and thus has higher adhesion to the anode lead. The resin layer has a low filler content and thus has low hardness, so that the exterior resin is not easily peeled off from the anode lead when stress is applied to an interface between the anode lead and the exterior resin. Thus, the adhesion between the anode lead and the resin layer can be increased by covering the outer periphery of the anode lead by the resin layer, as compared to the adhesion between the anode lead and the exterior resin. As a result, when forming a plating layer to be connected to the anode lead exposed at the outer surface of the exterior resin, the ingress of a plating solution into the capacitor element can be prevented, which can prevent or reduce the occurrence of a short circuit failure.

When producing the solid electrolytic capacitor of the present invention, preferably, the capacitor element in which at least a portion of the outer periphery of the anode lead is covered by the resin layer is first covered by the exterior resin, and the anode lead is then exposed from the exterior resin to form a plating layer on the exposed surface of the anode lead.

In the solid electrolytic capacitor of the present invention, the resin layer may cover the entirety of the outer periphery of the anode lead or may cover a portion of the outer periphery of the anode lead. In either case, preferably, the resin layer covers one lap around the outer periphery of the anode lead when viewed in the length direction.

In the solid electrolytic capacitor of the present invention, the filler content of the resin layer means the volume ratio (vol %) of the filler accounting for the entire volume of the resin layer. Similarly, the filler content of the exterior resin means the volume ratio (vol %) of the filler to the entire volume of the exterior resin.

The filler content of the resin layer is determined by measuring the area ratio of the filler to the resin layer in a cross-sectional image of the resin layer observed under a scanning electron microscope (SEM) and regarding the area ratio as the volume ratio. A material with a higher electron density is observed brighter in a SEM cross-sectional image, so that inorganic matter is observed brighter than organic matter, and conductive metals are observed brighter than oxides. Generally, the filler in the resin layer is made of insulating inorganic particles, so that the filler in the resin layer is distinguishable from organic matter such as resin components. Thus, the area ratio of the filler to the resin layer can be determined from the area of the filler to the resin layer and the entire area of the resin layer in the cross-sectional image in an observation region in the resin layer. The area ratio may be an average determined from multiples observation regions.

Specifically, the filler content of the resin layer is measured by the following method. The observation magnification varies depending on the particle size of the filler and the thickness of the resin layer, but a preferred magnification is one at which only the resin layer can be observed in the same field of view and at which ten or more particles of the filler can be observed in the same field of view regardless of the size of the filler. The area ratio of the filler in each field of view can be determined by observing five randomly selected sites at the above magnification and processing the image by binarization or the like.

The filler content of the exterior resin can be determined by the same method as described above. Even when a resin material defining the exterior resin is the same as a resin material defining the resin layer, an interface between the exterior resin and the resin layer can be distinguished in a SEM cross-sectional image, as long as the filler content is different. An interface between the exterior resin and the resin layer can also be distinguished in an elemental mapping image by scanning electron microscopy/energy dispersive X-ray spectroscopy (SEM-EDS).

In the solid electrolytic capacitor of the present invention, the filler content of the resin layer is not limited as long as it is lower than the filler content of the exterior resin, but lower the filler content of the resin layer, the higher the effect described above, further preventing or reducing the occurrence of a short circuit failure. In the solid electrolytic capacitor of the present invention, preferably, the filler content of the resin layer is 50% or less.

In the solid electrolytic capacitor of the present invention, preferably, the average particle size of the filler in the resin layer is smaller than the thickness of the resin layer.

The thickness of the resin layer is measured by the following method. The field of view is set to include the entire image of the resin layer in the thickness direction under a SEM, and three randomly selected sites of a cross section of the resin layer are observed. In one field of view, the thickness from the highest portion (a reference line) of the anode lead with the resin layer formed thereon to the surface of the resin layer is measured at five sites. The above measurement is performed in each field of view, and an average of the measurements at all the measurement sites is determined as the thickness of the resin layer.

The particle size of the filler in the resin layer can be calculated by regarding the shape of the filler in the resin layer as a sphere in a SEM cross-sectional image for measuring the thickness of the resin layer. The average particle size can be determined from an average of calculated particle sizes of 50 to 100 (both inclusive) filler particles observed in the cross-sectional image.

In the solid electrolytic capacitor of the present invention, the thickness of the resin layer between the exterior resin and the anode lead is preferably 1 μm to 500 μm, more preferably 5 μm to 500 μm. When the thickness of the resin layer is less than 1 μm, there may be a site where only the filler is locally present, resulting in insufficient adhesion to the anode lead. In contrast, when the thickness of the resin layer is more than 500 μm, the resin layer has a higher coefficient of linear expansion, resulting in larger volume changes in the resin layer associated with rapid temperature changes during reflow or the like, possibly leading to stress to the capacitor element and breakage of the package. As long as the thickness of the resin layer is in the above range, the adhesion between the resin layer and the anode lead can be ensured, providing tolerance to the capacitor element.

In the solid electrolytic capacitor of the present invention, preferably, the average particle size of the filler in the resin layer is smaller than the average particle size of the filler in the exterior resin.

The average particle size of the filler in the exterior resin can be determined from an average of calculated particles sizes of 50 to 100 (both inclusive) filler particles observed in a SEM cross-sectional image. As shown in FIG. 3, preferably, the particles of the filler in the exterior resin vary in size. Thus, a cross-sectional image for determining the average particle size of the filler in the exterior resin may be different from a cross-sectional image for determining the average particle size of the filler in the resin layer.

In the solid electrolytic capacitor of the present invention, the filler in the resin layer is made of insulating inorganic particles, for example. Examples of the insulating inorganic particles include silica particles.

In the solid electrolytic capacitor of the present invention, preferably, the resin layer contains an epoxy resin. The resin layer containing an epoxy resin has excellent heat resistance and chemical resistance, as compared to a resin layer containing a gelatinous resin or a rubbery resin as described in Patent Literature 2. Thus, the resin layer can maintain high adhesion, with resistance to external factors such as heat during reflow or a plating solution (strong acid, strong alkali).

In the solid electrolytic capacitor of the present invention, the resin layer may not be exposed at the outer surface of the exterior resin but is preferably exposed at the outer surface of the exterior resin. In other words, preferably, the anode lead, the exterior resin, and the resin layer are exposed at the same surface on which the first external electrode terminal is disposed.

In the solid electrolytic capacitor of the present invention, the filler in the exterior resin may be made of a material different from a material of the filler in the resin layer, but preferably, the filler in the exterior resin and the filler in the resin layer are made of the same material. Thus, preferably, the filler in the exterior resin is made of insulating inorganic particles, and more preferably, the filler in the exterior resin is made of silica particles.

In the solid electrolytic capacitor of the present invention, the exterior resin may contain a resin different from that in the resin layer, but preferably, the exterior resin and the resin layer contain the same resin. Thus, preferably, the exterior resin contains an epoxy resin.

In the solid electrolytic capacitor of the present invention, the anode lead is made of a valve metal that functions as a valve. Examples of the valve metal include elemental metals such as tantalum, aluminum, niobium, titanium, and zirconium, and alloys mainly containing at least one of these metals. Of these, tantalum and aluminum are preferred.

In the solid electrolytic capacitor of the present invention, the anode lead may have any shape, such as a wire shape or a flat sheet shape.

In the solid electrolytic capacitor of the present invention, the anode body is made of a valve metal. Preferably, the valve metal defining the anode body is the same type of metal as the valve metal defining the anode lead.

In the solid electrolytic capacitor of the present invention, the anode body includes a core and a porous portion on a surface of the core. Preferably, the porous portion of the anode body is a porous sintered body obtained by molding and firing valve metal powder. The porous portion of the anode body may be an etched layer on a surface of the anode body.

In the solid electrolytic capacitor of the present invention, the dielectric layer is on a surface of the porous portion of the anode body. The dielectric layer includes pores (recesses) as the dielectric layer is formed along the surface of the porous portion. Preferably, the dielectric layer is made of an oxide film of the valve metal.

In the solid electrolytic capacitor of the present invention, the cathode layer is on a surface of the dielectric layer. The cathode layer includes a solid electrolyte layer on the surface of the dielectric layer. Preferably, the cathode layer further includes a conductive layer on a surface of the solid electrolyte layer.

Examples of materials of the solid electrolyte layer include conductive polymers such as polypyrroles, polythiophenes, and polyanilines. Of these, polythiophenes are preferred, and poly(3,4-ethylenedioxythiophene) (PEDOT) is particularly preferred. Examples of the conductive polymers may also include dopants such as poly(styrene sulfonate) (PSS). Preferably, the solid electrolyte layer includes an inner layer filling the pores (recesses) of the porous portion (dielectric layer) and an outer layer covering the dielectric layer.

Preferably, the conductive layer includes a carbon layer as a base and a silver paste layer on the carbon layer. The conductive layer may include only a carbon layer or may include only a silver paste layer.

In the solid electrolytic capacitor of the present invention, the first external electrode terminal includes a plating layer connected to the anode lead exposed at the first outer surface of exterior resin. Examples of the plating layer include a Ni plating layer. The plating layer may include one plating layer or two or more plating layers. The first external electrode terminal may further include a conductive paste layer on the plating layer and may further include a plating layer on the conductive paste layer.

In the solid electrolytic capacitor of the present invention, the second external electrode terminal can be formed, for example, by plating, sputtering, dip coating, printing, or the like.

The solid electrolytic capacitor 1 shown in FIG. 1 is produced as follows, for example.

A sintered body obtained by molding and firing tantalum powder is provided as the anode body 12. The anode lead 11 made of a tantalum wire is inserted into the anode body 12. The anode lead 11 is buried in the sintered body such that a portion of the anode lead 11 sticks out from the sintered body.

The surface of the sintered body is anodized by applying a predetermined voltage thereto in phosphoric acid to form an oxide film having a predetermined thickness on the surface of the sintered body, whereby the dielectric layer 13 is formed on the surface of the anode body 12.

The solid electrolyte layer 15 made of a conductive polymer, the carbon layer 16, and the silver paste layer 17 are sequentially stacked on the surface of the dielectric layer 13 made of an oxide film to form the cathode layer 14. Thus, the capacitor element 10 is formed.

A highly viscous silver paste is applied in a bulky form to the silver paste layer 17 on a surface opposite to the surface where the anode lead 11 is buried, whereby the conductive paste layer 60 as a cathode collector layer is formed.

The resin layer 50 containing a resin component (epoxy resin) and inorganic filler (silica particles) is formed on a portion of the outer periphery of the anode lead 11 in the vicinity of the sintered body. Here, the ratio of the weight of the inorganic filler to the weight of the entire resin layer 50 is about 45%.

The exterior resin 20 containing a resin component (epoxy resin) and inorganic filler (silica particles) is formed to cover the entirety of the capacitor element 10, the resin layer 50, and the conductive paste layer 60. Here, the ratio of the weight of the inorganic filler to the weight of the entire exterior resin 20 is 85% or more.

The resulting molding including the exterior resin 20 is diced into pieces of individual product size at positions that include the anode lead 11 and the conductive paste layer 60. Then, the surfaces at which the anode lead 11 and the conductive paste layer 60 are exposed by dicing are immersed in a plating solution containing nickel ions, and nickel plating is deposited on at least a surface of the anode lead 11 and a surface of the conductive paste layer 60, whereby a nickel plating layer is formed on each exposed surface. Subsequently, a silver paste layer is formed on a surface of each nickel plating layer and a surface of the exterior resin 20. Then, a copper plating layer, a nickel plating layer, and a tin plating layer are sequentially stacked on each silver paste layer, whereby an external anode terminal and an external cathode terminal are formed. Thus, solid electrolytic capacitor chips are obtained.

In the first embodiment of the present invention, a resin layer having a lower filler content is used to increase the ratio of the resin component contributing to the adhesion and to reduce the hardness of the resin layer, whereby peeling off of the resin layer due to stress can be prevented. As a result, a gap is not easily generated between the anode lead and the resin layer. Further, the occurrence of a short circuit failure can be prevented or reduced by preventing the ingress of the plating solution.

In the above, the ratio of the weight of the inorganic filler to the weight of the entire resin layer 50 may be about 35% or about 25%. The lower the filler content, the higher the effect described above, further preventing or reducing the occurrence of a short circuit failure.

Figure 5:
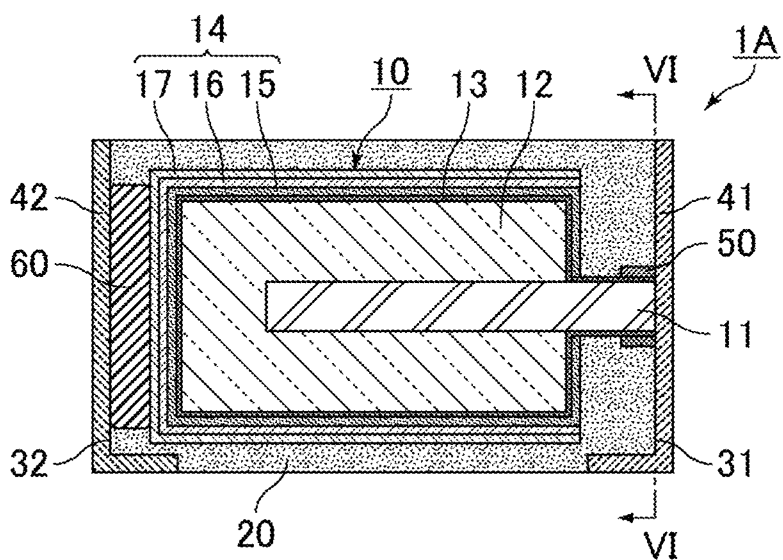
FIG. 5 is a schematic cross-sectional view of another example of the solid electrolytic capacitor according to the first embodiment of the present invention.
Figure 6:
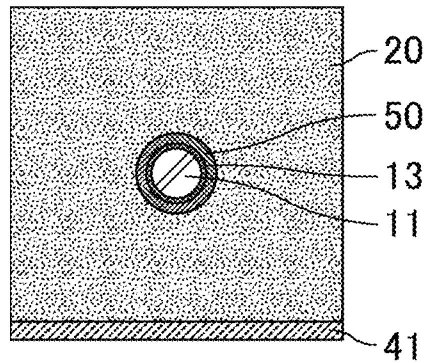
FIG. 6 is a VI-VI plane view of the solid electrolytic capacitor shown in FIG. 5.

FIG. 5 is a schematic cross-sectional view of another example of the solid electrolytic capacitor according to the first embodiment of the present invention. FIG. 6 is a VI-VI plane view of the solid electrolytic capacitor shown in FIG. 5.

As in a solid electrolytic capacitor 1A shown in FIG. 5, the resin layer 50 may be exposed at the first outer surface 31 of the exterior resin 20.

The solid electrolytic capacitor 1A shown in FIG. 5 may be produced similarly to the solid electrolytic capacitor 1, except that the resulting molding is diced into pieces of individual product size at positions including the anode lead 11, the resin layer 50 on the anode lead 11, and the conductive paste layer 60.

When exposing a cross section of the anode lead by dicing, stress is applied to the cross section from dicing with a dicing blade. Thus, the space between the anode lead and the exterior resin tends to be a starting point of a gap. A portion where the resin layer is formed has the highest adhesion so that dicing the molding at the portion is less likely to generate a starting point of a gap, further preventing or reducing the occurrence of a short circuit failure.

FIG. 7A, FIG. 7B, FIG. 7C, and FIG. 7D are each a schematic cross-sectional view of an example of the solid electrolytic capacitor with a different position of the resin layer.

Figure 7A:
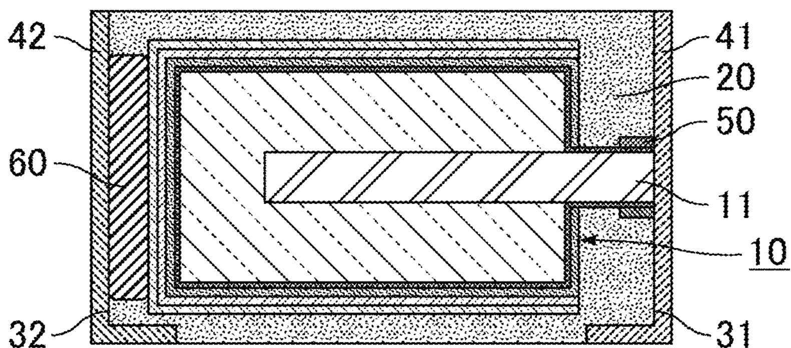
FIG. 7A, FIG. 7B, FIG. 7C, and FIG. 7D are each a schematic cross-sectional view of an example of the solid electrolytic capacitor with a different position of a resin layer.
Figure 7B:
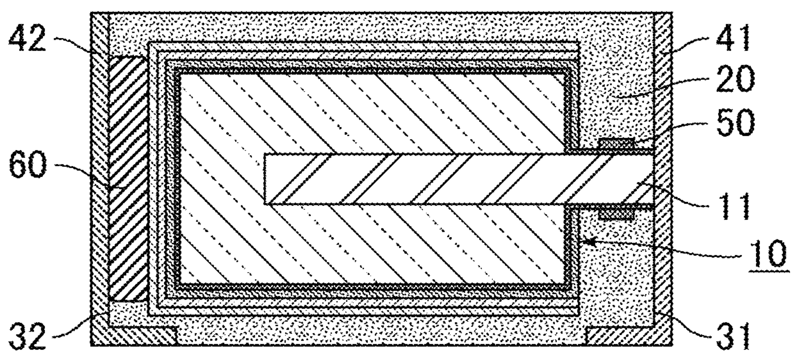
Figure 7C:
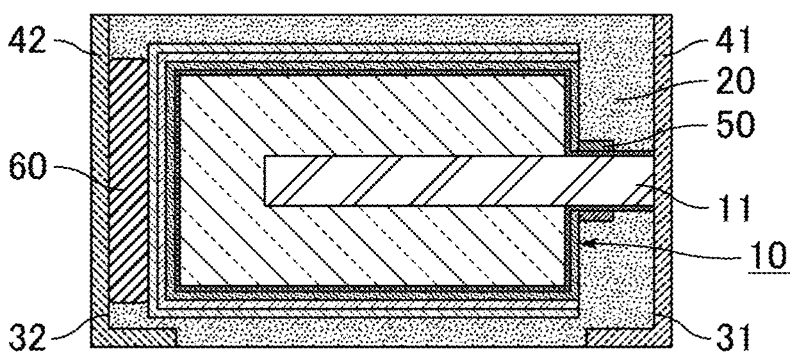
Figure 7D:
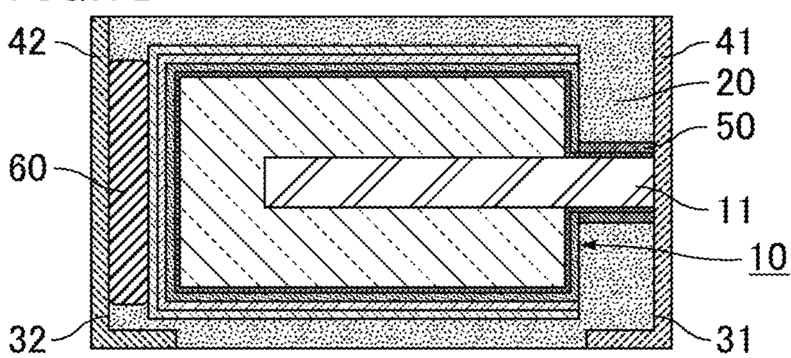

The resin layer 50 may be at any portion of the outer periphery of the anode lead 11 between the first outer surface 31 of the exterior resin 20 and the anode body 12, but the order of preference is FIG. 7D, FIG. 7A, FIG. 7B, and FIG. 7C. In particular, as shown in FIG. 7D and FIG. 7A, preferably, the resin layer 50 is exposed at the first outer surface 31 of the exterior resin 20.

Figure 8A:
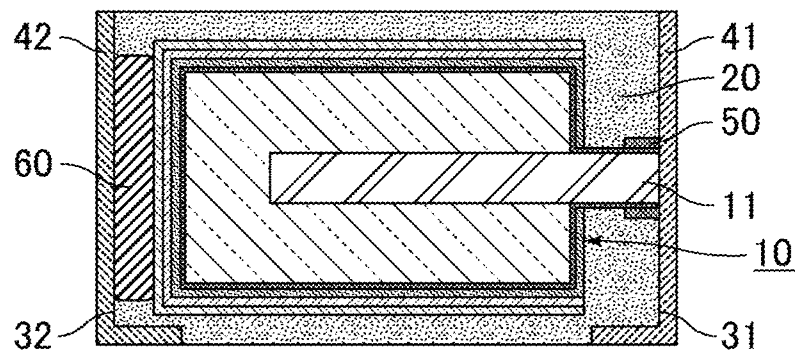
FIG. 8A, FIG. 8B, and FIG. 8C are each a schematic cross-sectional view of an example of the solid electrolytic capacitor with a different length of the resin layer.
Figure 8B:
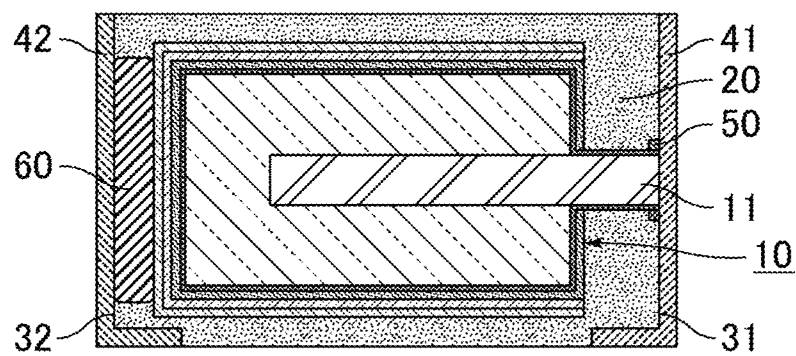
Figure 8C:
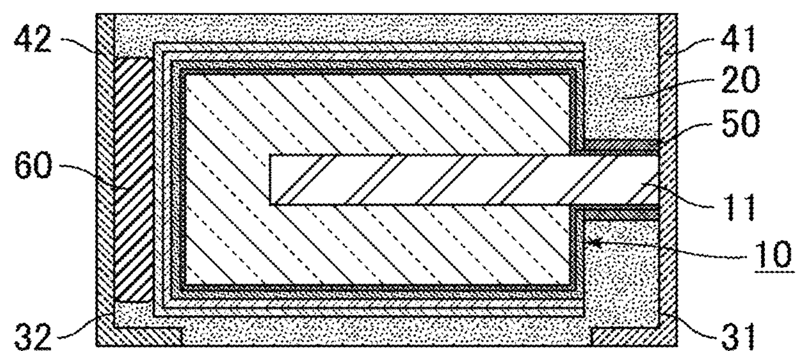

FIG. 8A, FIG. 8B, and FIG. 8C are each a schematic cross-sectional view of an example of the solid electrolytic capacitor with a different length of the resin layer.

It is better as the length of the resin layer 50 is greater between the first outer surface 31 of the exterior resin 20 and the anode body 12. The order of preference is FIG. 8C, FIG. 8A, and FIG. 8B. The length of the resin layer 50 is preferably 1 μm or more, for example.

Second Embodiment

In a solid electrolytic capacitor according to a second embodiment of the present invention, the capacitor element further includes a cathode lead made of metal and connected to the cathode layer. The second external electrode terminal includes a plating layer connected to the cathode lead exposed at a second outer surface of the exterior resin, and at least a portion of the outer periphery of the cathode lead between the second outer surface of the exterior resin and the anode body is covered by the resin layer having a lower filler content than the exterior resin.

In the second embodiment of the present invention, the outer periphery of the cathode lead is covered by the resin layer, whereby the ingress of a plating solution into the capacitor element can be prevented, thus preventing or reducing the occurrence of a short circuit failure, as in the first embodiment of the present invention.

The cathode lead is made of metal. Preferably, the cathode lead is made of at least one metal selected from the group consisting of aluminum, copper, silver, and an alloy mainly containing any of these metals. The cathode lead may be made of a valve metal.

Preferably, the cathode lead has a flat sheet shape. For example, the cathode lead is made of metal foil. The cathode lead may be metal foil whose surface is coated with carbon or titanium by a film forming method such as sputtering or deposition. In particular, use of carbon-coated aluminum foil is preferred.

Figure 9:
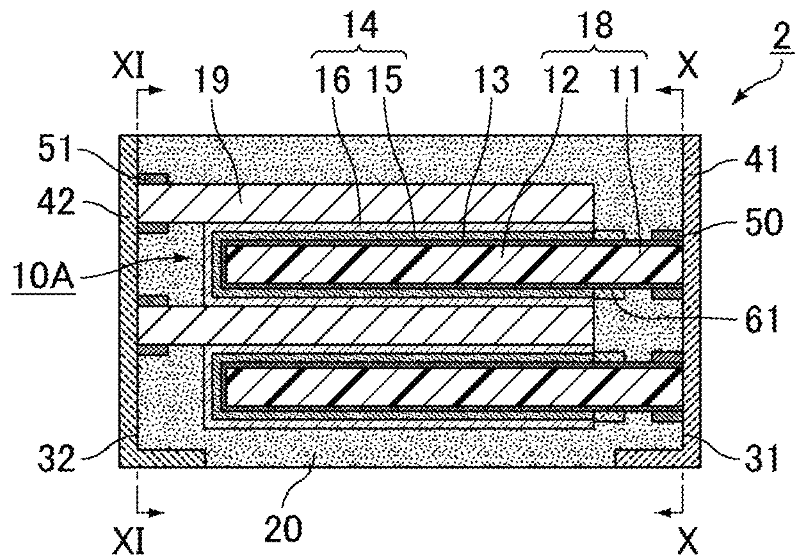
FIG. 9 is a schematic cross-sectional view of an example of a solid electrolytic capacitor according to a second embodiment of the present invention.
Figure 10:
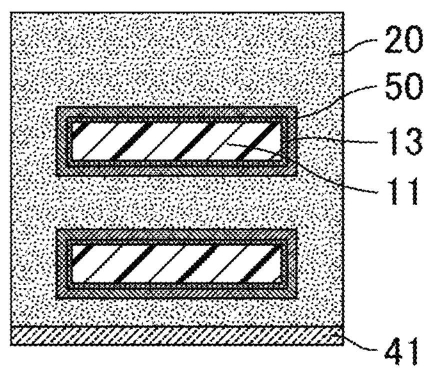
FIG. 10 is a X-X plane view of the solid electrolytic capacitor shown in FIG. 9.
Figure 11:
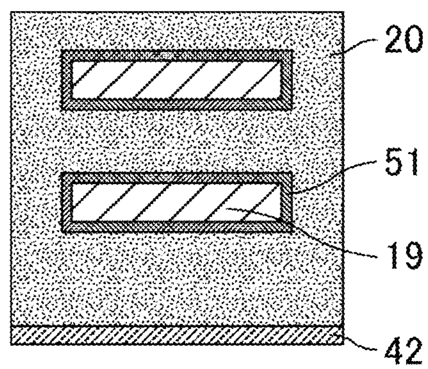
FIG. 11 is a XI-XI plane view of the solid electrolytic capacitor shown in FIG. 9.

FIG. 9 is a schematic cross-sectional view of an example of the solid electrolytic capacitor according to the second embodiment of the present invention. FIG. 10 is a X-X plane view of the solid electrolytic capacitor shown in FIG. 9. FIG. 11 is a XI-XI plane view of the solid electrolytic capacitor shown in FIG. 9.

A solid electrolytic capacitor 2 shown in FIG. 9 includes a capacitor element 10A, the exterior resin 20 covering the capacitor element 10A, the first external electrode terminal 41 on the first outer surface 31 of the exterior resin 20, and the second external electrode terminal 42 on the second outer surface 32 of the exterior resin 20. The first outer surface 31 and the second outer surface 32 are opposite to each other.

The capacitor element 10A includes anode foil 18 in which the anode lead 11 is integrated with the anode body 12, the dielectric layer 13 on a surface of the anode foil 18, the cathode layer 14 opposite to the anode body 12 via the dielectric layer 13, and a cathode lead 19 connected to the cathode layer 14. The anode foil 18 has a flat sheet shape and is made of aluminum foil, for example. In this case, the dielectric layer 13 can be formed by forming an oxide film on a surface of the aluminum foil. The cathode layer 14 includes the solid electrolyte layer 15 on a surface of the dielectric layer 13 and the carbon layer 16 on a surface of the solid electrolyte layer 15. The cathode lead 19 has a flat sheet shape and made of metal foil such as carbon-coated aluminum foil, for example.

As shown in FIG. 9 and FIG. 10, the anode lead 11 is exposed at the first outer surface 31 of the exterior resin 20. A portion of the outer periphery of the anode lead 11 between the first outer surface 31 of the exterior resin 20 and the anode body 12 is covered by the resin layer 50 having a lower filler content than the exterior resin 20.

The resin layer 50 may cover the entirety of the outer periphery of the anode lead 11 or may cover a portion of the outer periphery of the anode lead 11. The resin layer 50 may be exposed at the first outer surface 31 of the exterior resin 20 or may not be exposed at the first outer surface 31 of the exterior resin 20.

As shown in FIG. 9 and FIG. 11, the cathode lead 19 is exposed at the second outer surface 32 of the exterior resin 20. A portion of the outer periphery of the cathode lead 19 between the second outer surface 32 of the exterior resin 20 and the anode body 12 is covered by a resin layer 51 having a lower filler content than the exterior resin 20. The material of the resin layer 51 may be the same as or different from the material of the resin layer 50.

The resin layer 51 may cover the entirety of the outer periphery of the cathode lead 19 or may cover a portion of the outer periphery of the cathode lead 19. The resin layer 51 may be exposed at the second outer surface 32 of the exterior resin 20 or may not be exposed at the second outer surface 32 of the exterior resin 20.

As shown in FIG. 9, at least a portion of the outer periphery of the anode lead 11 may be covered by an insulating layer 61. Examples of the insulating layer 61 include insulating resins such as polyphenylsulfone resin, polyethersulfone resin, cyanate ester resin, fluorine resins (e.g., tetrafluoroethylene and tetrafluoroethylene-perfluoroalkyl vinyl ether copolymer), compositions containing a soluble polyimide siloxane and an epoxy resin, polyimide resin, polyamideimide resin, and derivatives or precursors thereof.

The first external electrode terminal 41 is an external anode terminal electrically connected to the anode body 12. The first external electrode terminal 41 includes a plating layer, and the plating layer is connected to the anode lead 11 exposed at the first outer surface 31 of the exterior resin 20. The plating layer may be directly connected to the anode lead 11 exposed at the first outer surface 31 of the exterior resin 20 or may be connected thereto via an auxiliary member.

The second external electrode terminal 42 is an external cathode terminal electrically connected to the cathode layer 14. The second external electrode terminal 42 includes a plating layer, and the plating layer is connected to the cathode lead 19 exposed at the second outer surface 32 of the exterior resin 20. The plating layer may be directly connected to the cathode lead 19 exposed at the second outer surface 32 of the exterior resin 20 or may be connected thereto via an auxiliary member.

The solid electrolytic capacitor 2 shown in FIG. 9 is produced as follows, for example.

A portion of the aluminum foil defining the flat sheet-shaped anode foil 18 is multifaceted by electrolytic etching to form an etched layer. As in the first embodiment, the dielectric layer 13 made of an oxide film, the solid electrolyte layer 15, and the carbon layer 16 are formed on the etched layer. Instead of the conductive paste layer 60 as the cathode collector layer, carbon-coated metal foil as the cathode lead 19 is connected to the carbon layer 16. The subsequent process is performed as in the first embodiment, whereby solid electrolytic capacitor chips are obtained.

Third Embodiment

A solid electrolytic capacitor according to a third embodiment of the present invention further includes a third external electrode terminal on a third outer surface of the exterior resin and electrically connected to the anode body. The anode lead passes through the anode body and is exposed also at the third outer surface of the exterior resin. The third external electrode terminal includes a plating layer connected to the anode lead exposed at the third outer surface of the exterior resin. At least a portion of the outer periphery of the anode lead between the third outer surface of the exterior resin and the anode body is covered by a resin layer having a lower filler content than the exterior resin.

In the third embodiment of the present invention, the outer periphery of the anode lead exposed at the both surfaces of the exterior resin is covered by the resin layer, whereby the ingress of a plating solution into the capacitor element can be prevented, thus preventing or reducing the occurrence of a short circuit failure, as in the first embodiment of the present invention.

Figure 12:
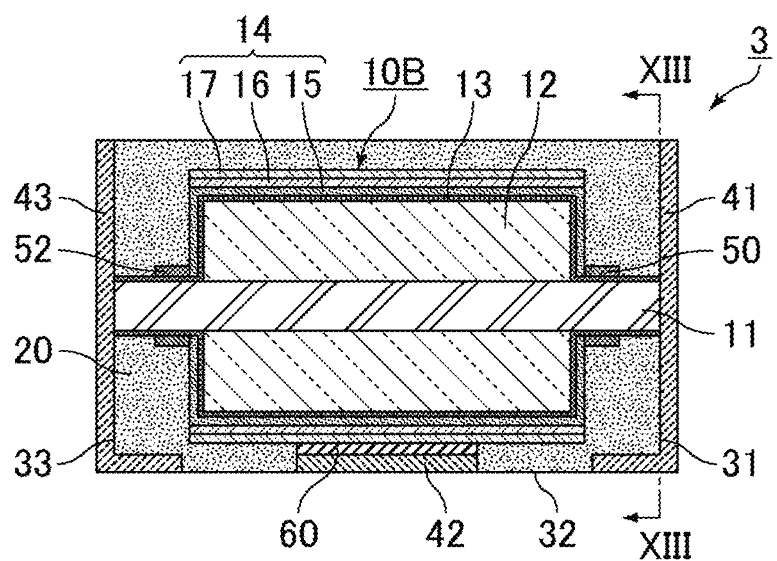
FIG. 12 is a schematic cross-sectional view of an example of a solid electrolytic capacitor according to a third embodiment of the present invention.
Figure 13:
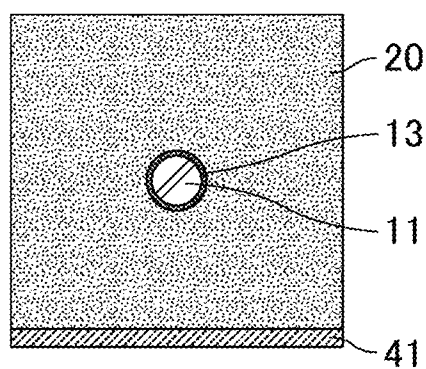
FIG. 13 is a XIII-XIII plane view of the solid electrolytic capacitor shown in FIG. 12.

FIG. 12 is a schematic cross-sectional view of an example of the solid electrolytic capacitor according to the third embodiment of the present invention. FIG. 13 is a XIII-XIII plane view of the solid electrolytic capacitor shown in FIG. 12.

A solid electrolytic capacitor 3 shown in FIG. 12 includes a capacitor element 10B, the exterior resin 20 covering the capacitor element 10B, the first external electrode terminal 41 on the first outer surface 31 of the exterior resin 20, the second external electrode terminal 42 on the second outer surface 32 of the exterior resin 20, and a third external electrode terminal 43 on a third outer surface 33 of the exterior resin 20. The first outer surface 31 and the third outer surface 33 are opposite to each other. The second outer surface 32 adjoins the first outer surface 31 and the third outer surface 33.

The capacitor element 10B includes the anode body 12 connected to the anode lead 11, the dielectric layer 13 on a surface of the anode body 12, and the cathode layer 14 opposite to the anode body 12 via the dielectric layer 13. The anode lead 11 has a wire shape and is made of a tantalum wire, for example. The anode lead 11 passes through the anode body 12. The anode body 12 is made of a sintered body of tantalum powder, for example. In this case, the dielectric layer 13 can be formed by forming an oxide film on a surface of the sintered body. The cathode layer 14 includes the solid electrolyte layer 15 on a surface of the dielectric layer 13, the carbon layer 16 on a surface of the solid electrolyte layer 15, and the silver paste layer 17 on a surface of the carbon layer 16. As shown in FIG. 12 and FIG. 13, the dielectric layer 13 may also be on a surface of a portion of the anode lead 11, the portion sticking out of the anode body 12.

As shown in FIG. 12 and FIG. 13, the anode lead 11 is exposed at the first outer surface 31 of the exterior resin 20. A portion of the outer periphery of the anode lead 11 between the first outer surface 31 of the exterior resin 20 and the anode body 12 is covered by the resin layer 50 having a lower filler content than the exterior resin 20.

The resin layer 50 may cover the entirety of the outer periphery of the anode lead 11 or may cover a portion of the outer periphery of the anode lead 11. The resin layer 50 may not be exposed as the first outer surface 31 of the exterior resin 20 or may be exposed at the first outer surface 31 of the exterior resin 20.

Further, the anode lead 11 is also exposed at the third outer surface 33 of the exterior resin 20. A portion of the outer periphery of the anode lead 11 between the third outer surface 33 of the exterior resin 20 and the anode body 12 is covered by a resin layer 52 having a lower filler content than the exterior resin 20. The material of the resin layer 52 may be the same as or different from the material of the resin layer 50.

The resin layer 52 may cover the entirety of the outer periphery of the anode lead 11 or may cover a portion of the outer periphery of the anode lead 11. The resin layer 52 may not be exposed at the third outer surface 33 of the exterior resin 20 or may be exposed at the third outer surface 33 of the exterior resin 20.

The first external electrode terminal 41 is an external anode terminal electrically connected to the anode body 12. The first external electrode terminal 41 includes a plating layer, and the plating layer is connected to the anode lead 11 exposed at the first outer surface 31 of the exterior resin 20. The plating layer may be directly connected to the anode lead 11 exposed at the first outer surface 31 of the exterior resin 20 or may be connected thereto via an auxiliary member.

The second external electrode terminal 42 is an external cathode terminal electrically connected to the cathode layer 14. The second external electrode terminal 42 includes a plating layer, for example, and the plating layer is connected to the cathode layer 14 via the conductive paste layer 60 such as a silver paste layer.

The third external electrode terminal 43 is an external anode terminal electrically connected to the anode body 12.

The third external electrode terminal 43 includes a plating layer, and the plating layer is connected to the anode lead 11 exposed at the third outer surface 33 of the exterior resin 20. The plating layer may be directly connected to the anode lead 11 exposed at the third outer surface 33 of the exterior resin 20 or may be connected thereto via an auxiliary member.

The solid electrolytic capacitor 3 shown in FIG. 12 is produced as follows, for example.

The anode lead 11 passes through the sintered body and sticking out toward the opposite surfaces of the sintered body. The resin layers 50 and 52 are formed on the respective sides of the anode lead 11. The subsequent process is performed as in the first embodiment, whereby solid electrolytic capacitor chips are obtained.

The solid electrolytic capacitor of the present invention is not limited to the above embodiments, and various modifications and changes can be made to the structure of the solid electrolytic capacitor, production conditions, and the like within the scope of the present invention.

REFERENCE SIGNS LIST

1, 1A, 2, 3 solid electrolytic capacitor
10, 10A, 10B capacitor element
11 anode lead
12 anode body
13 dielectric layer
14 cathode layer
15 solid electrolyte layer
16 carbon layer
17 silver paste layer
18 anode foil
19 cathode lead
20 exterior resin
31 first outer surface
32 second outer surface
33 third outer surface
41 first external electrode terminal
42 second external electrode terminal
43 third external electrode terminal
50, 51, 52 resin layer
60 conductive paste layer
61 insulating layer
F filler
G gap

The invention claimed is:

1. A solid electrolytic capacitor comprising:
a capacitor element including an anode body connected to an anode lead made of a valve metal, a dielectric layer on a surface of the anode body, and a cathode layer opposite to the anode body via the dielectric layer;
an exterior resin covering the capacitor element;
a first external electrode terminal on a first outer surface of the exterior resin and electrically connected to the anode body, the first external electrode terminal including a plating layer connected to the anode lead exposed at the first outer surface of the exterior resin;
a second external electrode terminal on a second outer surface of the exterior resin and electrically connected to the cathode layer; and
a resin layer having a lower filler content than the exterior resin and covering at least a portion of an outer periphery of the anode lead between the first outer surface of the exterior resin and the anode body.

2. The solid electrolytic capacitor according to claim 1, wherein the resin layer has a filler content of 50% or less.

3. The solid electrolytic capacitor according to claim 1, wherein the resin layer has a filler content of 25% to 45%.

4. The solid electrolytic capacitor according to claim 1, wherein a filler in the resin layer has an average particle size smaller than a thickness of the resin layer.

5. The solid electrolytic capacitor according to claim 1, wherein a thickness of the resin layer is 1 μm to 500 μm.

6. The solid electrolytic capacitor according to claim 1, wherein an average particle size of a filler in the resin layer is smaller than an average particle size of a filler in the exterior resin.

7. The solid electrolytic capacitor according to claim 1, wherein a length of the resin layer between the first outer surface of the exterior resin and the anode body is 1 μm or more.

8. The solid electrolytic capacitor according to claim 7, wherein the resin layer is exposed at the first outer surface of the exterior resin.

9. The solid electrolytic capacitor according to claim 1, wherein the resin layer covers an entirety of the outer periphery of the anode lead between the first outer surface of the exterior resin and the anode body.

10. The solid electrolytic capacitor according to claim 9, wherein the resin layer is exposed at the first outer surface of the exterior resin.

11. The solid electrolytic capacitor according to claim 1, wherein the resin layer is a first resin layer,
the capacitor element further includes a cathode lead made of metal and connected to the cathode layer,
the second external electrode terminal includes a plating layer connected to the cathode lead exposed at the second outer surface of the exterior resin, and
at least a portion of an outer periphery of the cathode lead between the second outer surface of the exterior resin and the anode body is covered by a second resin layer having a lower filler content than the exterior resin.

12. The solid electrolytic capacitor according to claim 11, wherein the second resin layer is exposed at the second outer surface of the exterior resin.

13. The solid electrolytic capacitor according to claim 12, wherein the first resin layer is exposed at the first outer surface of the exterior resin.

14. The solid electrolytic capacitor according to claim 1, wherein the resin layer is a first resin layer and the anode lead passes through the anode body and is exposed at a third outer surface of the exterior resin, the solid electrolytic capacitor further comprising a third external electrode terminal on the third outer surface of the exterior resin and electrically connected to the anode lead,
the third external electrode terminal including a plating layer connected to the anode lead exposed at the third outer surface of the exterior resin, and
at least a portion of an outer periphery of the anode lead between the third outer surface of the exterior resin and the anode body is covered by a second resin layer having a lower filler content than the exterior resin.

15. The solid electrolytic capacitor according to claim 1, wherein the anode lead has a wire shape or a flat sheet shape.

16. The solid electrolytic capacitor according to claim 1, wherein the resin layer is exposed at the first outer surface of the exterior resin.

17. The solid electrolytic capacitor according to claim 16, wherein the resin layer covers an entirety of the outer periphery of the anode lead between the first outer surface of the exterior resin and the anode body.

* * * * *